United States Patent
Feng et al.

(10) Patent No.: US 11,816,200 B2
(45) Date of Patent: Nov. 14, 2023

(54) TERMINAL AND METHOD FOR MANAGING LAUNCH OF AN APPLICATION OF A TERMINAL

(71) Applicant: JRD COMMUNICATION (SHENZHEN) LTD, Guangdong (CN)

(72) Inventors: Ke Feng, Guangdong (CN); Yajun Hu, Guangdong (CN); Xinyao Ye, Guangdong (CN); Bing Wang, Guangdong (CN); Yijun Lai, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 1280 days.

(21) Appl. No.: 16/261,562

(22) Filed: Jan. 30, 2019

(65) Prior Publication Data

US 2019/0156017 A1 May 23, 2019

Related U.S. Application Data

(63) Continuation of application No. PCT/CN2017/105790, filed on Oct. 12, 2017.

(30) Foreign Application Priority Data

Oct. 14, 2016 (CN) .......................... 201610900089.6

(51) Int. Cl.
    G06F 21/44        (2013.01)
    G06F 9/445        (2018.01)
(52) U.S. Cl.
    CPC .......... G06F 21/44 (2013.01); G06F 9/44505 (2013.01)
(58) Field of Classification Search
    CPC .............................. G06F 21/44; G06F 9/44505
    See application file for complete search history.

(56) References Cited

U.S. PATENT DOCUMENTS 9,141,774 B2 * 9/2015 Zheng ..................... G06F 21/36
9,615,193 B1 * 4/2017 Savant .................... H04W 4/60
(Continued)

FOREIGN PATENT DOCUMENTS

CN           104361465 A    *    2/2015
CN           104391743 A    *    3/2015
(Continued)

OTHER PUBLICATIONS

Huang, et al.; An Open and Automated Android Behavior Monitor in Cloud, University of Taiwan, 2014 (Year: 2014).*

*Primary Examiner* — Yin Chen Shaw
*Assistant Examiner* — Alex D Carrasquillo
(74) *Attorney, Agent, or Firm* — PV IP PC; Wei Te Chung; Zhigang Ma

(57) ABSTRACT

The present disclosure provides a terminal and a method for managing launch of an application of the terminal. The method includes: receiving a first indication from a user, wherein the first indication indicates that the launch of the application needs to be banned; in response to the first indication, setting the application to a launch-restricted state, wherein the launch-restricted state means that the application is prohibited from being launched by itself or by other applications; receiving a second indication from a user, wherein the second indication indicates that the launch-restricted state needs to be removed; and in response to the second indication, setting the application to a launch-allowable state, wherein the launch-allowable state means that the application is allowed to be launched by itself or by other applications.

4 Claims, 11 Drawing Sheets

(56) References Cited

U.S. PATENT DOCUMENTS

| | | | |
|---|---|---|---|
| 10,591,981 B2 * | 3/2020 | Guo | .................... G06F 1/3287 |
| 2016/0019092 A1 | 1/2016 | Yuan et al. | |

FOREIGN PATENT DOCUMENTS

| | | | | |
|---|---|---|---|---|
| CN | 104391743 A | | 3/2015 | |
| CN | 104462980 A | * | 3/2015 | ............. G06F 21/51 |
| CN | 104462980 A | | 3/2015 | |
| CN | 105022665 A | * | 11/2015 | |
| CN | 105022665 A | | 11/2015 | |
| CN | 105094279 A | | 11/2015 | |
| CN | 105955792 A | | 9/2016 | |
| CN | 106022099 A | | 10/2016 | |
| CN | 106406944 A | * | 2/2017 | |
| WO | WO-2013093011 A1 | * | 6/2013 | .......... G06F 11/3438 |

* cited by examiner

Zone II

TERMINAL AND METHOD FOR MANAGING LAUNCH OF AN APPLICATION OF A TERMINAL

CROSS-REFERENCE TO RELATED APPLICATIONS

The present application is a continuation-application of International (PCT) Patent Application No. PCT/CN2017/105790, filed on Oct. 12, 2017, which claims foreign priority of Chinese Patent Application No. 201610900089.6, filed on Oct. 14, 2016 in the National Intellectual Property Administration of China, the entire contents of which are hereby incorporated by reference.

TECHNICAL FIELD

The present disclosure generally relates to the electronic devices, and in particular to a terminal and a method for managing launch of an application of the terminal.

BACKGROUND

With the rapid development of electronic technology and the improvement of people's life quality, the usage of various smart terminals such as mobile phone is more and more popular. Different kinds of applications may be installed on the terminal. Some applications, especially the third-party applications, are not restricted by the operation system specification of the terminal, and may be secretly launched in the back-end of the operation system. The launch of these kinds of applications may cause not only waste of network traffic but also increase of memory occupation. Thus, the speed of the operations system may be degraded.

Currently there are two ways for restricting the launch of application. The first solution is modifying the platform code of the operation system. In this way, the launch of application may be restricted. However, modification of the platform code of the operation system may reduce the stability of the operation system, which may increase maintenance difficulty. Besides, the portability of this solution is very low. The second solution is restricting the static broadcast component of the operation system. In this way, the application can be disabled to be launched by itself. However, the application can still be launched by other applications in this situation.

SUMMARY

Accordingly, certain embodiments of the present disclosure provide a terminal and a method for managing launch of an application of the terminal. The implementation of the present disclosure may prevent the target application from being launched by itself or by other applications without modifying the platform code of the operation system. The portability of the solution is strong, and no additional hardware cost is raised.

In an aspect, a method for managing launch of an application of a terminal is provided. The method includes: receiving a first indication from a user, wherein the first indication indicates that the launch of the application needs to be banned; in response to the first indication, setting the application to a launch-restricted state, wherein the launch-restricted state means that the application is prohibited from being launched by itself or by other applications; receiving a second indication from a user, wherein the second indication indicates that the launch-restricted state needs to be removed; and in response to the second indication, setting the application to a launch-allowable state, wherein the launch-allowable state means that the application is allowed to be launched by itself or by other applications.

In another aspect of the present disclosure, a method for managing launch of an application of a terminal is provided. The method includes: receiving a first indication from a user; and in response to the first indication, prohibiting the application from being launched by itself and by other applications.

In another aspect of the present disclosure, a terminal is provided. The terminal includes a processor, a memory, a communication interface and a communication bus, wherein the communication bus and the communication interface are configured to acquire data, the memory is configured to store program instructions, the processor is configured to execute the program instructions and to perform the above-mentioned method for managing launch of an application of the terminal.

According to the present disclosure, only through active operation of the user can the application be launched by itself or by other applications. It is possible to code a script or program for configuring the state of the application as long as it can be supported by the operation system. It is not necessary to modify the platform code of the operation system. Thus, the portability of the solution is strong, and no additional hardware cost is raised.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

Figure 1:
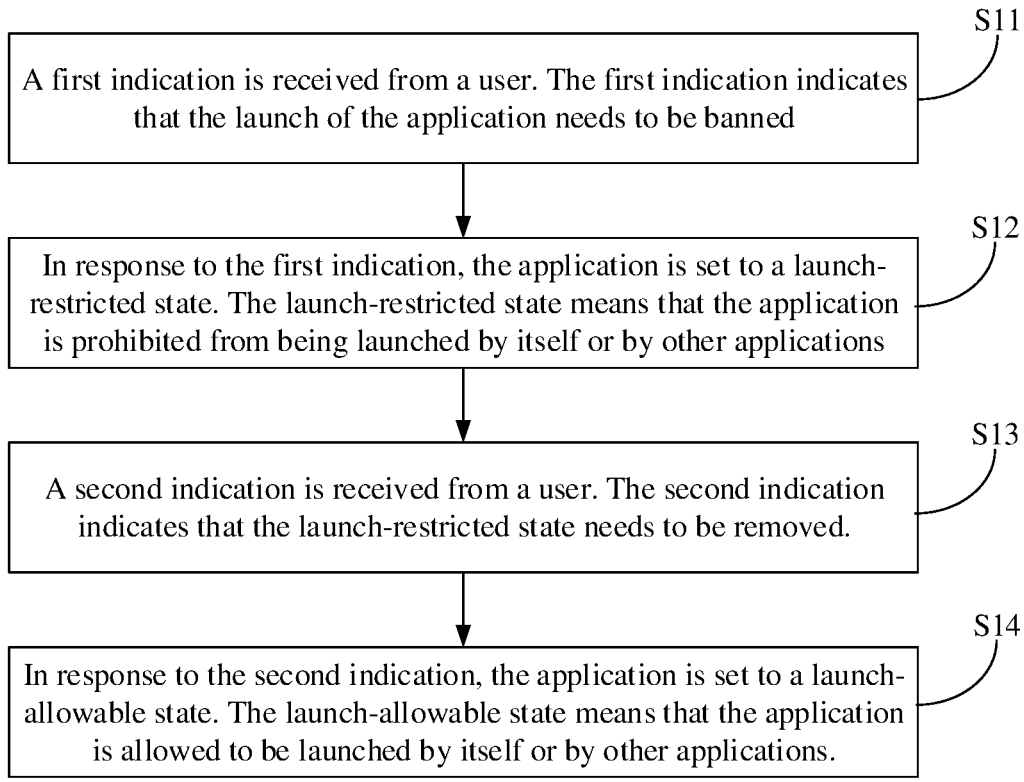
FIG. 1 is a flow chart of a method for managing launch of an application according to an embodiment of the present disclosure.

FIG. 1 shows a method for managing launch of an application according to an embodiment of the present disclosure. The method may include operations described in blocks S11~S14.

S11: A first indication is received from a user. The first indication indicates that the launch of the application needs to be banned.

S12: In response to the first indication, the application is set to a launch-restricted state. The launch-restricted state means that the application is prohibited from being launched by itself or by other applications.

S13: A second indication is received from a user. The second indication indicates that the launch-restricted state needs to be removed.

S14: In response to the second indication, the application is set to a launch-allowable state. The launch-allowable state means that the application is allowed to be launched by itself or by other applications.

Figure 2:
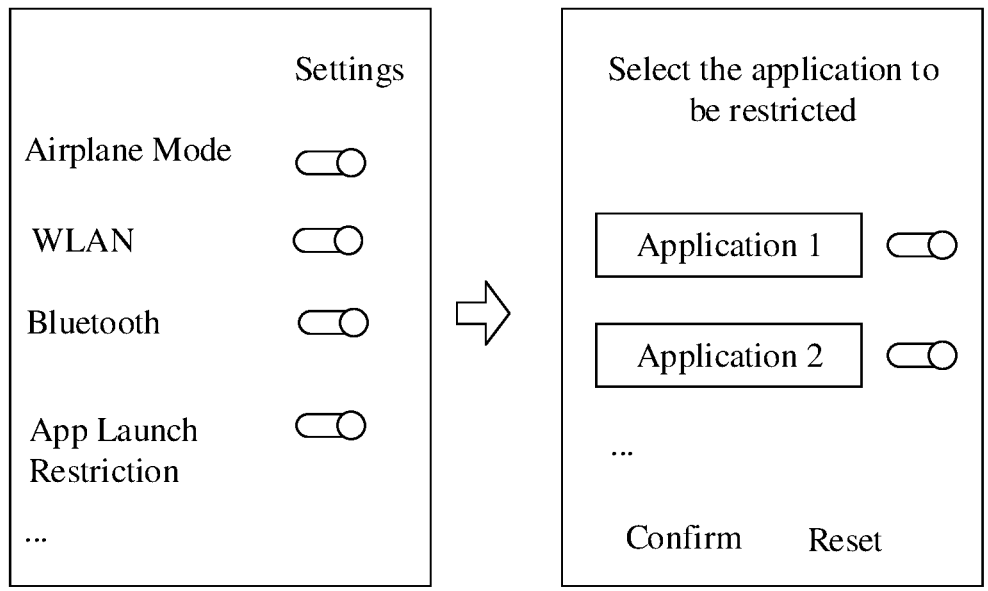
FIG. 2 shows an exemplary interface for restricting the launch of an application according to an embodiment of the present disclosure.

The implementation of this embodiment of the present disclosure may add a function for controlling and restricting the launch of applications for a terminal. It can be applied in various scenarios. For example, a script or program may be prepared so as to provide an option of "App Launch Restriction" in the setting interface of a cellphone. A user may drag the slider to open this option, and then the interface shown in FIG. 2 in which the application to be restricted may be configured is displayed. In this interface, all applications installed on the terminal may be listed. Every application has a corresponding slider. The user may drag the slider to allow or to restrict the launch of the corresponding application.

In other words, according to this embodiment of the present disclosure, the first indication and the second indication may be provided through the UI interface of the script or program run in the operation system. As compared with the current launch restriction methods, it is possible to code a script or program for configuring the state of the application as long as it can be supported by the operation system. It is not necessary to modify the platform code of the operation system. Thus, the portability of the solution is strong, and no additional hardware cost is raised.

The principle of the present disclosure is to configure the launch-restricted and launch-allowable states of an application, i.e., to restrict or allow the launch of the application, in a pure software way (e.g., by coding a script or program).

Figure 3:
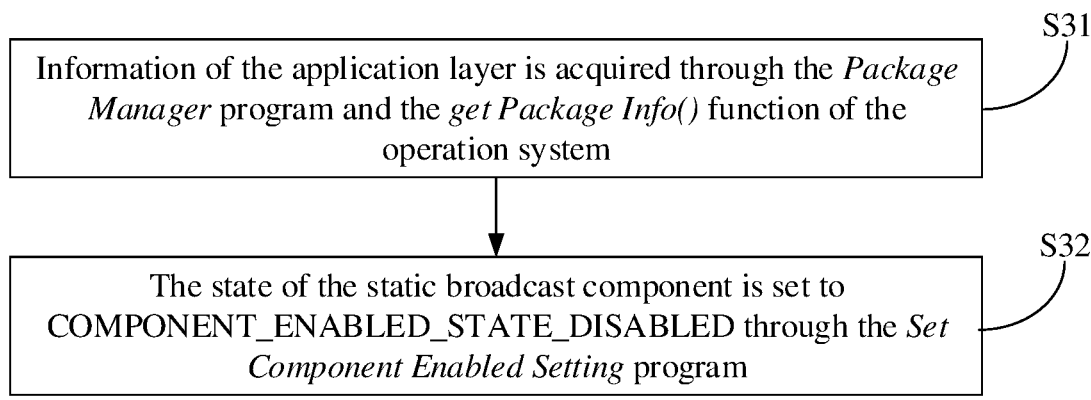
FIG. 3 is a flow chart of a method for prohibiting an application from being launched by itself according to an embodiment of the present disclosure.
Figure 4:
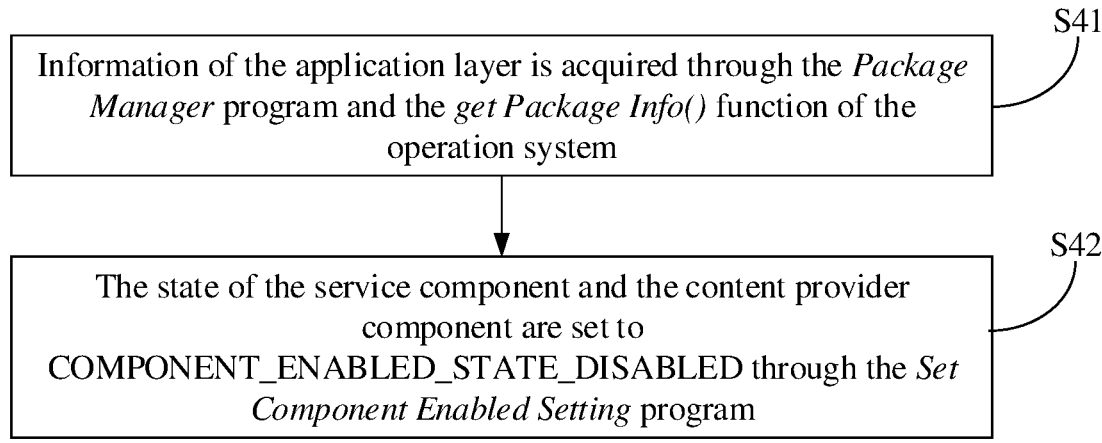
FIG. 4 is a flow chart of a method for prohibiting an application from being launched by other applications according to an embodiment of the present disclosure.

For restricting the launch of an application, the proper component may be banned according to an embodiment of the present disclosure, which can be achieved in the application layer of the operation system. Taking the Android operation system as an example, as shown in FIG. 3, the method for prohibiting an application from being launched by itself may include operations described in blocks S31~S32, and as shown in FIG. 4, the method for prohibiting an application from being launched by other applications may include operations described in blocks S41~S42.

S31: Information of the application layer is acquired through the Package Manager program and the get Package Info( ) function of the operation system.

S32: The state of the static broadcast component is set to COMPONENT_ENABLED_STATE_DISABLED through the Set Component Enabled Setting program.

In other words, the static broadcast component of the application of the operation system is disabled, such that the application is prohibited from being launched by itself.

S41: Information of the application layer is acquired through the Package Manager program and the get Package Info( ) function of the operation system.

S42: The states of the service component and the content provider component are set to COMPONENT_ENABLED_STATE_DISABLED through the Set Component Enabled Setting program.

In other words, the service component and the content provider component of the application of the operation system are disabled, such that the application is prohibited from being launched by other applications.

Correspondingly, according to the present disclosure, the static broadcast component of the application may be enabled, such that the application is allowed to be launched by itself. Similarly, the service component and the content provider component of the application may be enabled, such that the application is allowed to be launched by other applications.

According to the present disclosure, only through active operations of a user can the launch of the application be allowed. It is important for the terminal to detect the second indication provided by the user. That is, the key point is how to listen the action of the user clicking the icon in the terminal interface to remove the launch restriction. Thus, two solutions are given as respectively shown in FIGS. 5 and 6.

Figure 5:
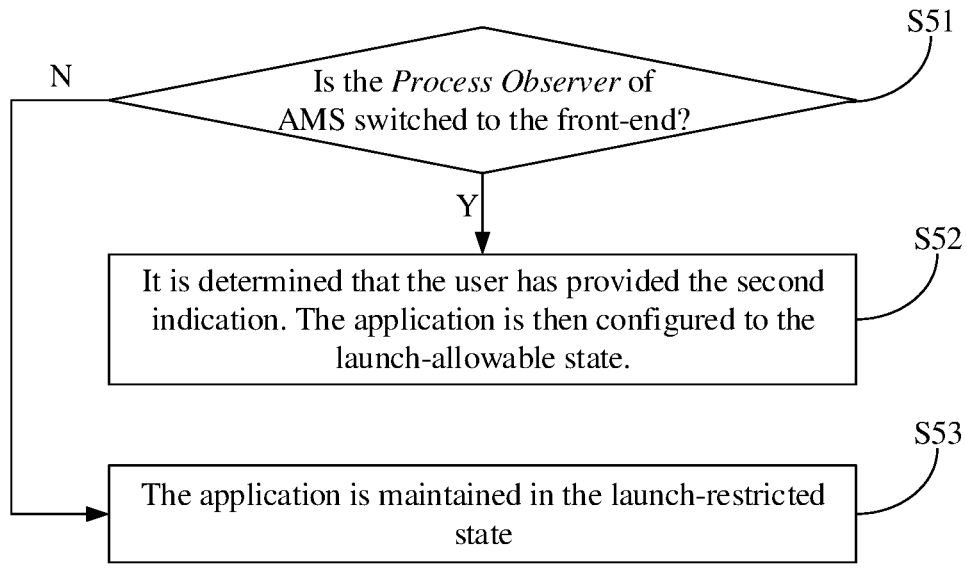
FIG. 5 is a flow chart of a method for allowing an application from being launched according to an embodiment of the present disclosure.

Referring to FIG. 5, the method may include operations described in blocks S51~S53.

S51: The Process Observer of the Activity Manager Service (AMS) program is monitored so as to detect whether it is switched to the front-end.

When it is detected that the Process Observer is switched to the front-end, the operation of block S52 is executed. Otherwise, the operation of block S53 is executed.

S52: It is determined that the user has provided the second indication. The application is then configured to the launch-allowable state. Whether the user actively launches the application is detected by the AMS/PMS and input/output system.

S53: The application is maintained in the launch-restricted state.

The AMS program may detect the state of the Process Observer is changed to PROCESS_STATE_TOP, which means that the process is switched the front-end. According to the present disclosure, the static broadcast component, the service component and the content provider component of the application may all be enabled. The broadcast ACTION_PACKAGE_CHANGED which indicates the change of situation of the application may be sent.

Figure 6:
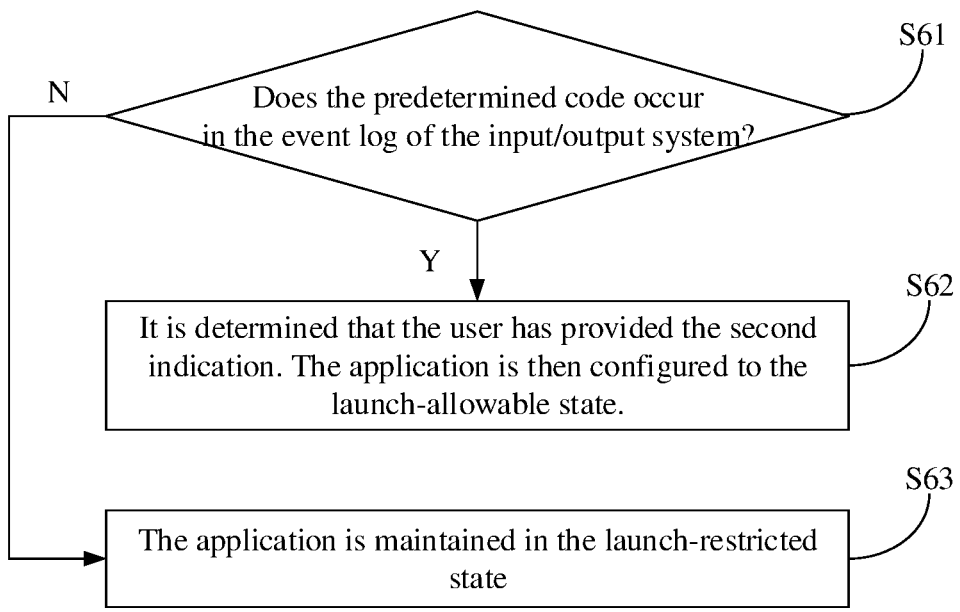
FIG. 6 is a flow chart of a method for allowing an application from being launched according to another embodiment of the present disclosure.

The method shown in FIG. 6 may include operations described in blocks S61~S63.

S61: Whether a predetermined code occurs in the event log of the input/output system is detected. The predetermined code indicates that the application is launched in the interface of the terminal.

If it is detected that the predetermined code occurs, the operation described in the block S62 is executed. Otherwise, the operation described in the block S63 is executed.

S62: It is determined that the user has provided the second indication. The application is then configured to the launch-allowable state.

S63: The application is maintained in the launch-restricted state.

If it is detected that the event log includes the code am_create_activity or am_proc_start, it means a process is launched. If the event log includes the predetermined code android.intent.action.MAIN, it means that the process is launched in the interface of the terminal. According to the present disclosure, the static broadcast component, the service component and the content provider component can all be enabled.

According to the present disclosure, only through active operation of the user can the application be allowed to be launched by itself or by other applications. It is possible to code a script or program for configuring the state of the application as long as it can be supported by the operation system. It is not necessary to modify the platform code of the operation system. Thus, the portability of the solution is strong, and no additional hardware cost is raised.

Moreover, since memory occupation may be reduced, the implementation of the present disclosure may extend the battery life of the terminal. For example, supposing there are 20 applications installed in a cellphone, if the cellphone does not restrict the launch of applications in the back-end, the real-time current of the cellphone may be 137.6 mA. If the battery capacity of the cellphone is 2000 mAh, the cellphone can only operate for 21.8 h. If the cellphone can restrict the launch of applications, the real-time current of the cellphone may be 19.7 mA. In this situation, a cellphone with a same battery may operate for 152 h. Power consumption in the latter case may be very close to that of airplane mode. Thus, the battery life of the cellphone may be significantly extended.

Figure 7:
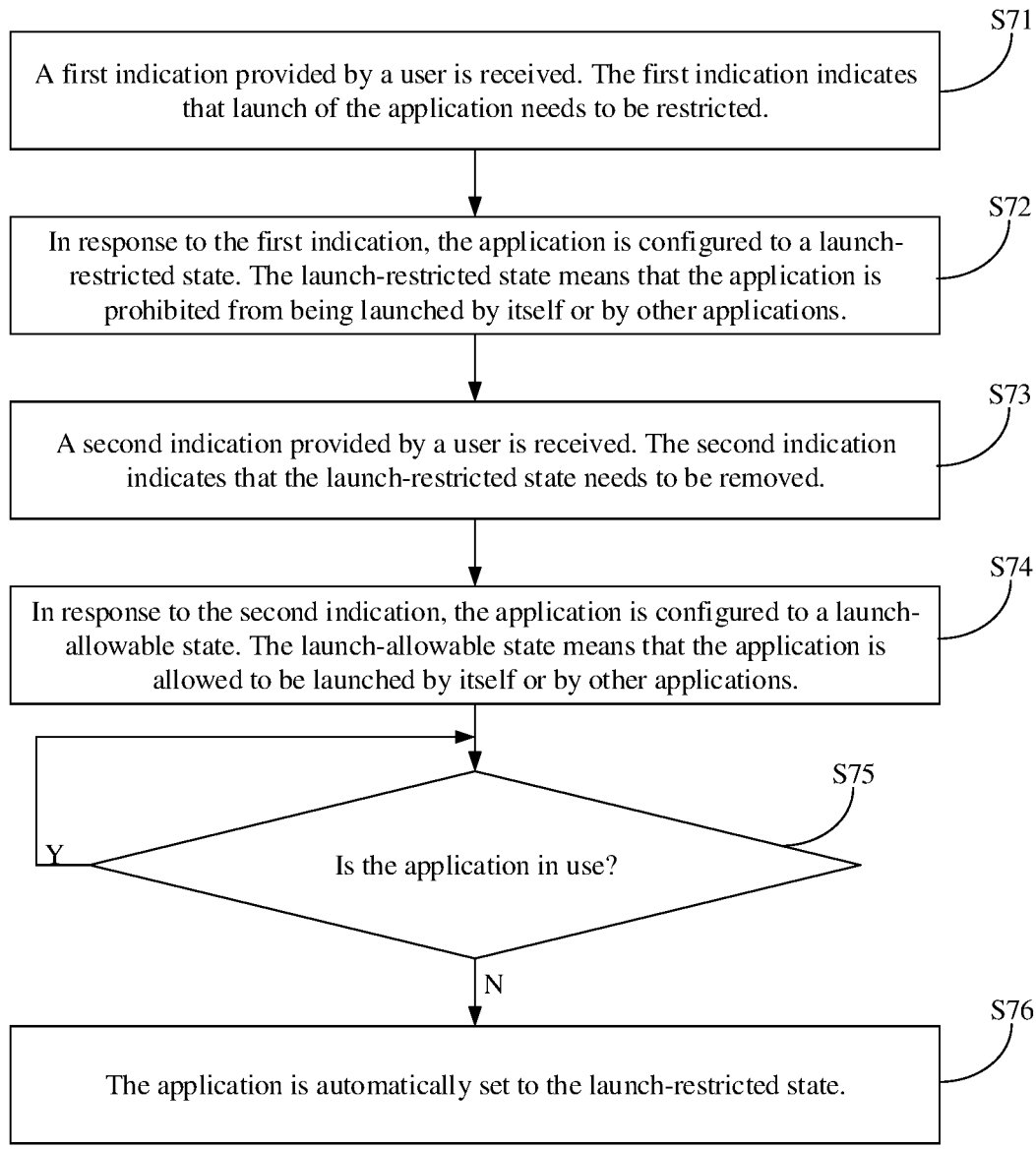
FIG. 7 is a flow chart of a method for managing launch of an application according to another embodiment of the present disclosure.

FIG. 7 shows a method for managing launch of an application according to another embodiment of the present disclosure. The method may include operations described in blocks S71~S76.

S71: A first indication provided by a user is received. The first indication indicates that launch of the application needs to be restricted.

S72: In response to the first indication, the application is configured to a launch-restricted state. The launch-restricted state means that the application is prohibited from being launched by itself or by other applications.

S73: A second indication provided by a user is received. The second indication indicates that the launch-restricted state needs to be removed.

S74: In response to the second indication, the application is configured to a launch-allowable state. The launch-allowable state means that the application is allowed to be launched by itself or by other applications.

S75: Whether the application is in use is detected.

For example, if the screen of the terminal is turned off or the terminal is powered off, it can be determined that the application is not in use.

If the application is not in use, the operation of block S76 is executed. If the application is in use, the application is maintained in the launch-allowable state, and the operation of block S75 is then executed.

S76: The application is automatically set to the launch-restricted state.

Based on above description, after the user actively launches the application, it is possible to determine whether launch of the application needs to be restricted again according to the actual usage state of the application. Specifically, the application which is not in use may be re-configured to the launch-restricted state, such that it cannot be launched by itself or other applications.

Figure 8A:
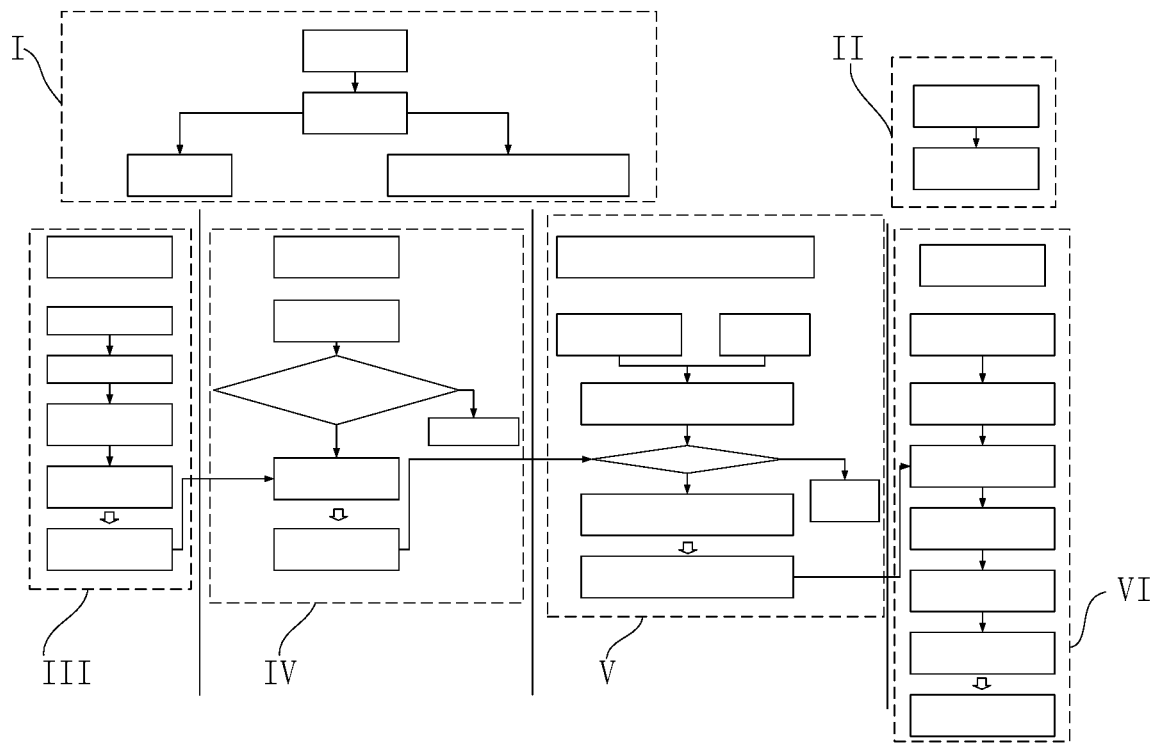
FIGS. 8A-8G show a method for managing launch of an application according to yet another embodiment of the present disclosure, wherein detailed descriptions of each blocks of zones I to VI of FIG. 8A are illustrated in FIG. 8B to 8G respectively.
Figure 8B:
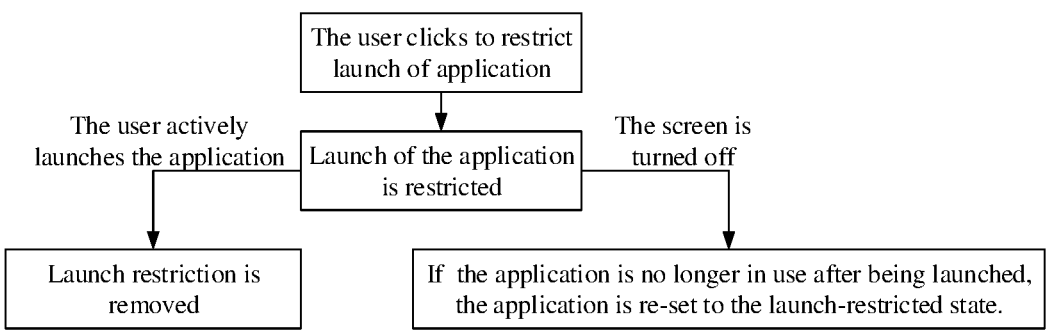
Figure 8C:
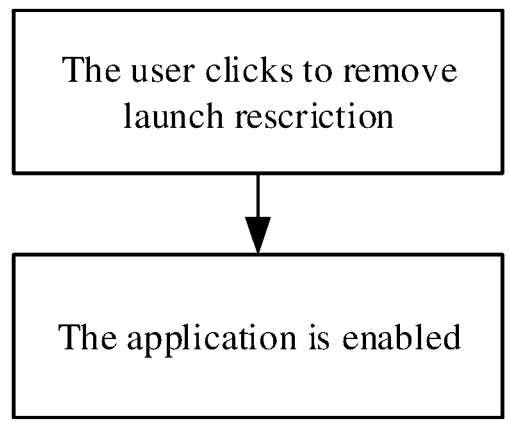
Figure 8D:
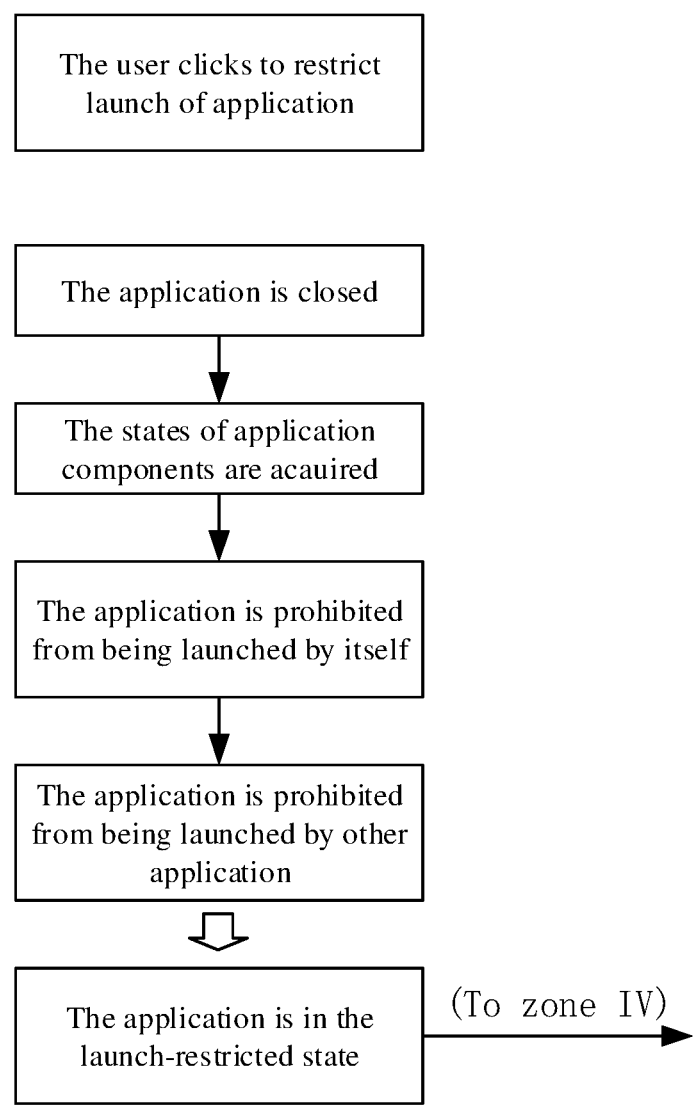
Figure 8E:
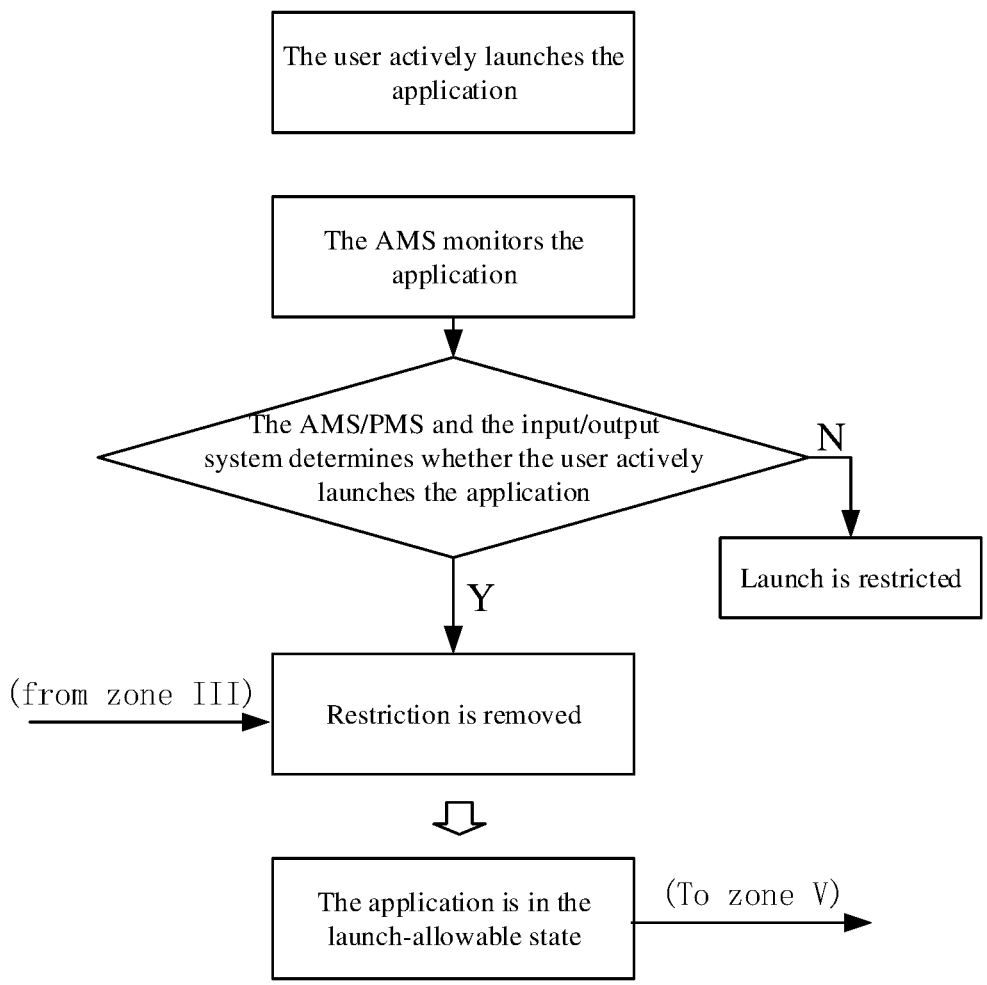
Figure 8F:
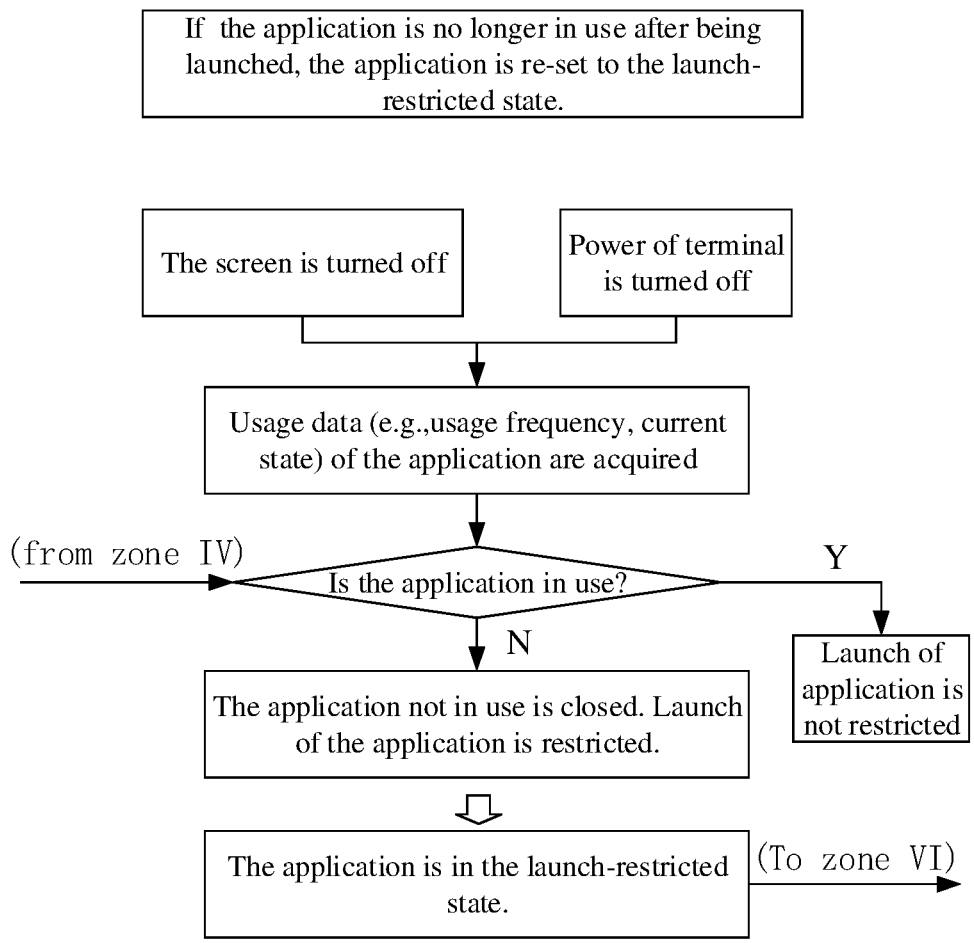
Figure 8G:
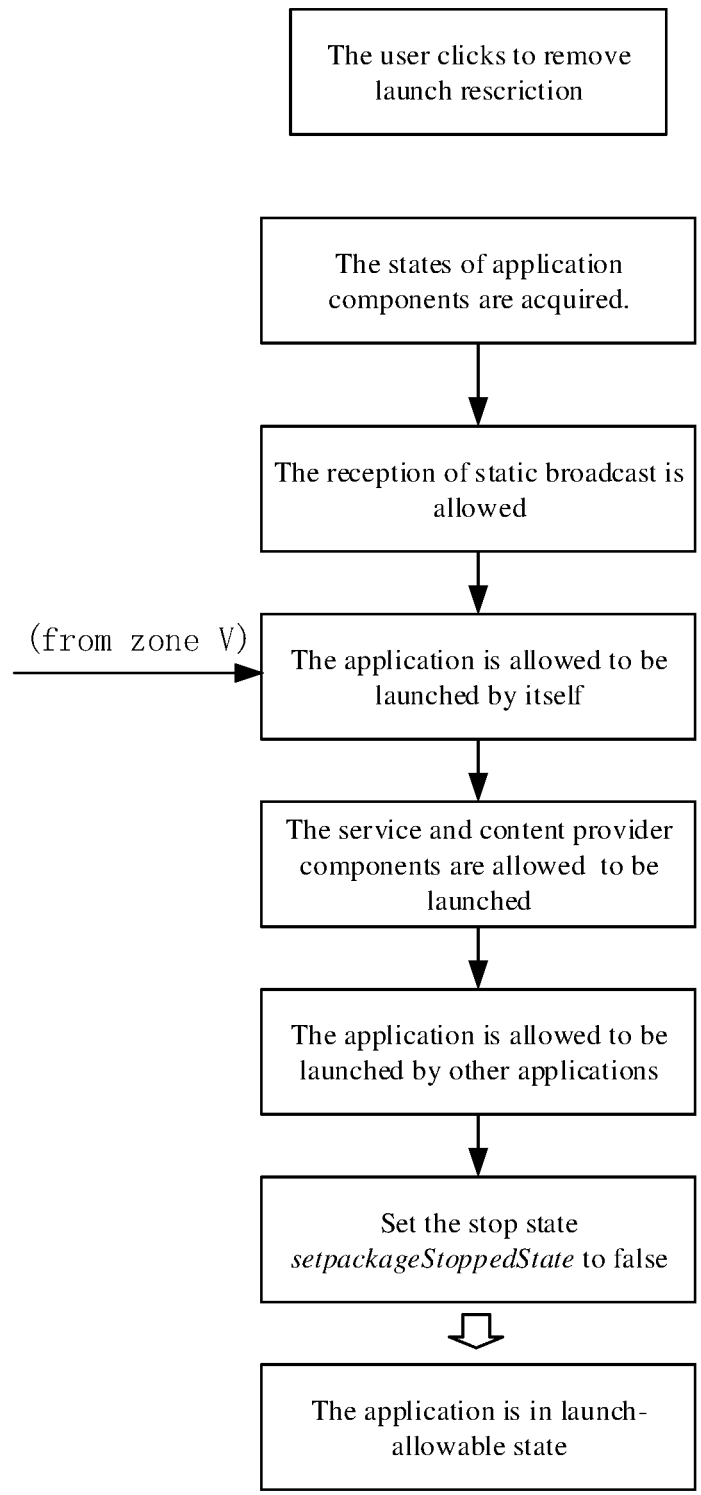

FIG. 8A shows an application scenario of the method for managing launch of an application. Moreover, for clearly illustrating details of FIG. 8A, FIGS. 8B-8G are provided for respectively presenting zones I-VI of FIG. 8A in detail. This embodiment presents the whole process described in the above embodiments, which will not be repeated herein.

When embodied in the form of software functions and are sold or used as individual products, the functions may be stored in computer readable storage medium. Based on such understanding, the technical solution in the present invention, the part of the present invention that makes contributions to the prior art, or part of the technical solution can be substantively embodied in the form of software products, this computer software product is stored in a storage medium, and contains several instructions for enabling a computer device, such as a personal computer, a server or a network device, to perform all or part of the steps of the method in the embodiments of the present invention.

Figure 9:
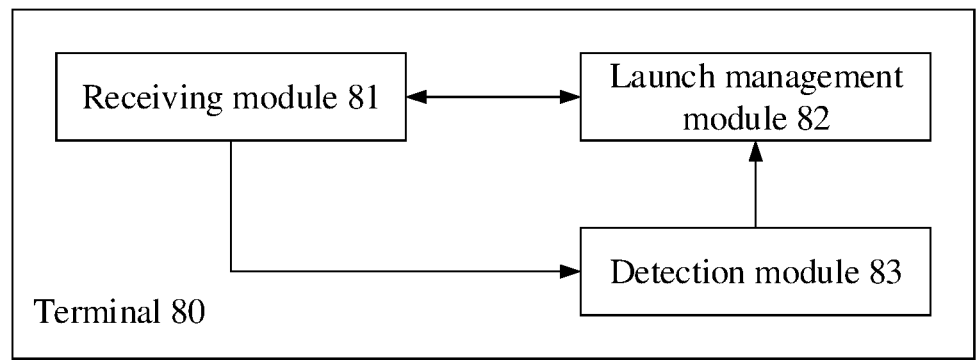
FIG. 9 shows a structural diagram of a terminal according to an embodiment of the present disclosure.

FIG. 9 shows a structural diagram of a terminal according to an embodiment of the present disclosure. The terminal 80 may include a receiving module 81 and a launch management module 82. The receiving module 81 may be configured to receive from a user a first indication which indicates that the launch of the application needs to be banned. The launch management module 82 may be configured to set the application to a launch-restricted state in response to the first indication. The launch-restricted state means that the application is prohibited from being launched by itself or by other applications. The receiving module 81 may be further configured to receive from a user a second indication which indicates that the launch-restricted state needs to be removed. The launch management module 82 may be further configured to set the application to a launch-allowable state. The launch-allowable state means that the application is allowed to be launched by itself or by other application.

The launch management module 82 may restrict launch of the application by disabling components of the application. Specifically, the launch management module 82 is configured to disable a static broadcast component of the application of the operation system such that the application is prohibited from being launched by itself, and to disable a service component and a content provider component such that the application is prohibited from being launched by other applications. Correspondingly, the launch management module 82 may enable the static broadcast component of the application such that the application may be allowed to be launched by itself, or enable the service component and the content provider component of the application such that the application may be allowed to be launched by other applications.

The launch management module 82 may determine that the user has provided the second indication in two ways. That is, the launch management module 82 may monitor the action of the user clicking the icon in the interface of the terminal 80 for removing the launch restriction. According to a first solution, a detection module 83 of the terminal 80 may detect whether the Process Observer of the AMS program of the operation system is switched to the front-end. When it is detected that the Process Observer is switched to the front-end, the detection module 83 may determine that the user has provided the second indication. According to a second solution, the detection module 83 may detect whether a predetermined code occurs in the event log of the input/output system program of the operation system. The predetermined code may indicate that the application is launched in the interface of the terminal 80. When it is detected that the predetermined code occurs in the event log, the detection module 83 may determine that the user has provided the second indication.

In some embodiments, the terminal 80 may further be configured to decide whether to restrict launch of the application again based on its actual usage situation after the user actively launches the application, so as to re-configure the application which is not in use to the launch-restricted state such that the application cannot be launched by itself or by other applications. Specifically, after the launch management module 82 sets the application to the launch-allowable state in response to the second indication, the detection module 83 may detect whether the application is in use. If the application is not in use, the launch management module 82 may automatically set the application to the launch-restricted state. If the application is in use, the launch management module 82 may maintain the application in the launch-allowable state.

The modules of the terminal 80 in this embodiment may correspond to the method for managing launch of the application of the foregoing embodiments. Thus, similar technical effects may be acquired.

It should be understood, the above-listed modules are merely logical division. It can be divided in other ways. For example, two modules may be integrated in one same system. Some features may be omitted or may not be executed. The modules may be connected together through a certain interface electrically. The modules may be realized in way of software functions, or in way of hardware architecture as shown in FIG. 10.

Figure 10:
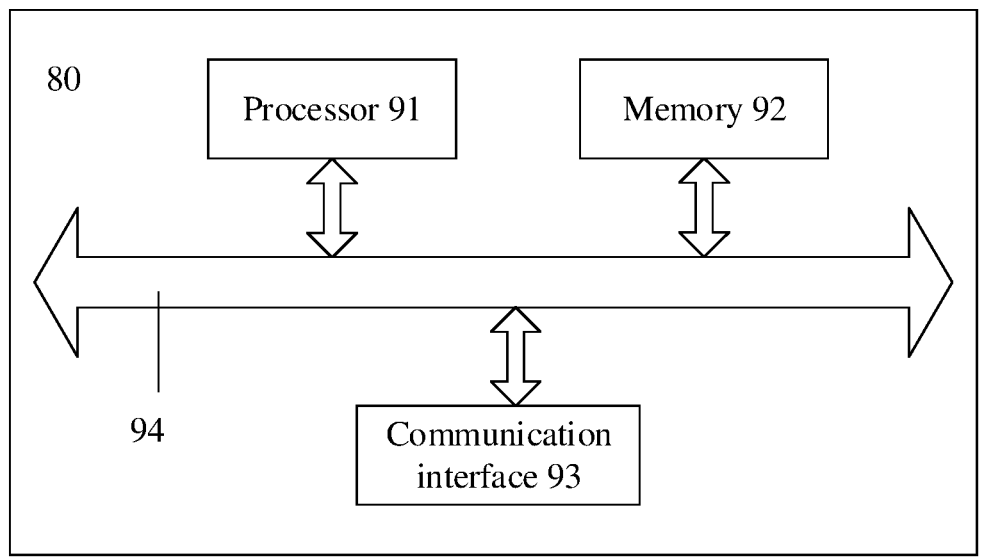
FIG. 10 shows a hardware structure of a terminal according to an embodiment of the present disclosure.

As shown in FIG. 10, the terminal 80 may include at least one processor 91, at least one memory 92, at least one communication interface 93 and at least one communication bus 94. The communication bus 94 and the communication interface 93 may be utilized to acquire data. The memory 92 may be utilized to store program instructions. For illustrative purpose, only one processor 91, one memory 92, one communication interface 93 and one communication bus 94 are shown in FIG. 10.

The processor 91 is configured to execute program instructions so as to control the communication interface 93 to receive from a user a first indication which indicates that launch of the application needs to be banned.

The processor 91 is further configured to execute program instructions so as to set the application to the launch-restricted state in response to the first indication. The launch-restricted state means that the application is prohibited from being launched by itself or by other applications.

The processor 91 is further configured to execute program instructions so as to control the communication interface 93 to receive from a user a second indication which indicates that the launch-restriction state needs to be removed.

The processor 91 is further configured to execute program instructions so as to set the application to the launch-allowable state in response to the second indication. The launch-allowable state means that the application is allowed to be launched by itself or by other applications.

The processor 91 may restrict launch of the application by disabling components of the application. Specifically, the processor 91 is configured to execute program instructions so as to disable a static broadcast component of the application of the operation system such that the application is prohibited from being launched by itself, and to disable a service component and a content provider component such that the application is prohibited from being launched by other applications. Correspondingly, the processor 91 may be configured to execute program instructions so as to enable the static broadcast component of the application such that the application may be allowed to be launched by itself, or to enable the service component and the content provider component of the application such that the application may be allowed to be launched by other applications.

The processor 91 may determine that the user has provided the second indication in two ways. That is, processor 91 may monitor the action of the user clicking the icon in the interface of the terminal 80 for removing the launch restriction. According to a first solution, the processor 91 may execute program instructions so as to detect whether the Process Observer of the AMS program of the operation system is switched to the front-end. When it is detected that the Process Observer is switched to the front-end, the processor 91 may determine that the user has provided the second indication. According to a second solution, the processor 91 may detect whether a predetermined code occurs in the event log of the input/output system program of the operation system. The predetermined code may indicate that the application is launched in the interface of the terminal 80. When it is detected that the predetermined code occurs in the event log, the processor 91 may determine that the user has provided the second indication.

In some embodiments, the processor 91 may further be configured to decide whether to restrict launch of the application again based on its actual usage situation after the user actively launches the application, so as to re-configure the application which is not in use to the launch-restricted state such that the application cannot be launched by itself or by other applications. Specifically, after the processor 91 sets the application to the launch-allowable state in response to the second indication, the processor 91 may execute program instructions so as to detect whether the application is in use. If the application is not in use, the processor 91 may automatically set the application to the launch-restricted state. If the application is in use, the processor 91 may maintain the application in the launch-allowable state.

The terminal of various embodiments of the present disclosure may refer to a smart phone, personal digital assistant, tablet computer, laptop and the like. It may also refer to a wearable device that can be worn or embedded in clothes, jewelries or accessories. It may also be other smart electronic devices having application displaying function.

The foregoing is merely embodiments of the present disclosure, and is not intended to limit the scope of the disclosure. Any transformation of equivalent structure or equivalent process which uses the specification and the accompanying drawings of the present disclosure, or is applied in other related technical fields, are likewise included within the scope of the protection of the present disclosure.

What is claimed is:

1. A method for managing launch of an application of a terminal, comprising:

receiving a first indication from a user, wherein the first indication indicates that the launch of the application needs to be banned;

in response to the first indication, setting the application to a launch-restricted state, wherein the launch-restricted state means that the application is prohibited from being launched by itself or by other applications;

receiving a second indication from a user, wherein the second indication indicates that the launch-restricted state needs to be removed; and in response to the second indication, setting the application to a launch-allowable state, wherein the launch-allowable state means that the application is allowed to be launched by itself or by other applications;

wherein the setting the application to the launch-restricted state in response to the first indication comprises:

disabling a static broadcast component of the application of an operation system of the terminal such that the application is prohibited from being launched by itself; and disabling a service component and a content provider component of the application of the operation system of the terminal such that the application is prohibited from being launched by other applications;

the setting the application to the launch-allowable state in response to the second indication comprises:

enabling the static broadcast component of the application such that the application is allowed to be launched by itself; and enabling the service component and the content provider component of the application such that the application is allowed to be launched by other applications;

wherein the method further comprises:

after the receiving the second indication from the user, detecting whether a Process Observer of an Activity Manager service (AMS) program of the operation system is switched to a front-end; and when it is detected that the Process Observer is switched to the front-end, determining that the user has provided the second indication.

2. The method of claim 1, further comprising:

after the setting the application to the launch-allowable state in response to the second indication, detecting whether the application is in use;

when it is detected that the application is not in use, automatically setting the application to the launch-restricted state; and when it is detected that the application is in use, maintaining the application in the launch-allowable state.

3. A terminal, comprising a processor, a memory, a communication interface and a communication bus, wherein the communication bus and the communication interface are configured to acquire data, the memory is configured to store program instructions, the processor is configured to execute the program instructions and to perform a method for managing launch of an application, the method comprises:

receiving a first indication from a user, wherein the first indication indicates that the launch of the application needs to be banned;

in response to the first indication, setting the application to a launch-restricted state, wherein the launch-restricted state means that the application is prohibited from being launched by itself or by other applications;

receiving a second indication from a user, wherein the second indication indicates that the launch-restricted state needs to be removed; and in response to the second indication, setting the application to a launch-allowable state, wherein the launch-allowable state means that the application is allowed to be launched by itself or by other applications;

wherein the setting the application to the launch-restricted state in response to the first indication comprises:

disabling a static broadcast component of the application of an operation system of the terminal such that the application is prohibited from being launched by itself; and disabling a service component and a content provider component of the application of the operation system of the terminal such that the application is prohibited from being launched by other applications;

the setting the application to the launch-allowable state in response to the second indication comprises:

enabling the static broadcast component of the application such that the application is allowed to be launched by itself; and enabling the service component and the content provider component of the application such that the application is allowed to be launched by other applications;

wherein the method further comprises:

after the receiving the second indication from the user, detecting whether a Process Observer of an Activity Manager service (AMS) program of the operation system is switched to a front-end; and when it is detected that the Process Observer is switched to the front-end, determining that the user has provided the second indication.

4. The terminal of claim 3, wherein the method further comprises:

after the setting the application to the launch-allowable state in response to the second indication, detecting whether the application is in use;

when it is detected that the application is not in use, automatically setting the application to the launch-restricted state; and when it is detected that the application is in use, maintaining the application in the launch-allowable state.

* * * * *